United States Patent [19]

Kobayashi

[11] 3,746,955

[45] July 17, 1973

[54] ADAPTIVE CONTROL SYSTEM FOR NUMERICAL CONTROL OF A CUTTING TOOL

[75] Inventor: Kengo Kobayashi, Kawasaki-shi, Japan

[73] Assignee: Fujitsu Limited, Kawasaki, Japan

[22] Filed: Mar. 23, 1971

[21] Appl. No.: 127,221

[30] Foreign Application Priority Data

Mar. 24, 1970 Japan.............................. 45/24594

[52] U.S. Cl. .................................. 318/561, 82/2 B
[51] Int. Cl. ......................................... G05b 13/00
[58] Field of Search............ 82/2 B, DIG. 4, DIG. 9; 318/571, 570, 561

[56] References Cited
UNITED STATES PATENTS

| | | | |
|---|---|---|---|
| 3,122,691 | 2/1964 | Centner et al. ..................... | 82/2 B |
| 3,473,435 | 10/1969 | Tse et al. ......................... | 82/DIG. 9 |
| 3,548,172 | 12/1970 | Centner et al. .................... | 82/2 B |
| 3,573,588 | 4/1971 | Geyer et al. ...................... | 82/2 B |

Primary Examiner—Leonidas Vlachos
Attorney—Curt M. Avery, Arthur E. Wilfond, Herbert L. Lerner and Daniel J. Tick

[57] ABSTRACT

A detector detects the state of load of machine, for example, the torque load of the spindle or the cutting resistance of the tool. Control means connected to the detector compares the detected load with an allowable magnitude and moves the tool away from the workpiece in a specific direction to reduce the load when the detected load exceeds the allowable magnitude thereby providing cutting of the workpiece by the tool at a state of load maintained at a magnitude very close to the allowable magnitude by not exceeding such magnitude.

5 Claims, 11 Drawing Figures

Patented July 17, 1973  3,746,955

ADAPTIVE CONTROL SYSTEM FOR NUMERICAL CONTROL OF A CUTTING TOOL

DESCRIPTION OF THE INVENTION

The invention relates to an adaptive control system. More particularly the invention relates to an adaptive control system for numerical control of a cutting tool working on a workpiece mounted on a machine spindle rotating about its axis. The tool has a cutting resistance and the spindle has a torque load. The numerical control system of the invention is thus especially applicable to a numerically controlled engine lathe.

In a known type of numerical control system for a machine tool, the cutting tool is generally moved along a path commanded by the commands of a program recorded on tape or other suitable recording medium. The movement of the tool relative to the workpiece therefore cannot be varied arbitrarily. Thus, where the magnitude of cutting is not suitable the tool is broken or the fuse in the control circuit is blown, resulting quite often in difficulties.

The principal object of the invention is to provide an adaptive control system for numerical control of a cutting tool which maintains state of load of machine, for example, the torque load or cutting resistance at a magnitude very close to the allowable magnitude of the torque load and cutting resistance but not exceeding such magnitude.

In accordance with the invention, an adaptive control system for numerical control of a cutting tool working on a workpiece mounted on a machine spindle rotated about its axis, the tool having a cutting resistance and the spindle having a torque load, comprises detecting means for detecting the state of load of machine, for example, the torque load of the spindle or the cutting resistance of the tool. Control means connected to the detecting means compares the detected state of load with an allowable magnitude and moves the tool away from the workpiece in a specific direction to reduce the load of machine when the detected load exceeds the allowable magnitude thereby providing cutting of the workpiece by the tool at a state of load maintained at a magnitude very close to the allowable magnitude but not exceeding the magnitude.

In accordance with the invention, an adaptive control system for numerical control of a cutting tool cutting a workpiece mounted on a machine spindle rotated about its axis, the tool having a cutting resistance and the spindle having a torque load, comprises program means for controlling the movement of the tool in accordance with a recorded program including a plurality of recorded command pulses on a record medium. Detecting means detects the state of load of the machine. Comparing means connected to the detecting means compares the detected state of load with an allowable magnitude. Compensating means connected to the comparing means adds compensating pulses to the command pulses provided by the program means when the detected state of load exceeds the allowable magnitude thereby modifying the path of the tool in a direction which reduces the state of load and cutting resistance. Counter means coupled to the compensating means stores the compensating pulses in a manner whereby when the command pulses and the compensating pulses are provided in the same direction the number of the command pulses is subtracted from the contents of the counter means so that the difference between the tool path commanded by the program means and the actual position of the tool is stored in the counter means, and when the contents of the counter means become zero one cutting operation is determined to be ended and the tool is reset to the starting point of the operation and the record medium is simultaneously rewound and a similar cutting operation is performed beginning with the starting point of the operation, and if the detected one of the load torque of the spindle and the cutting resistance of the tool does not exceed the allowable magnitude during all the cutting operations all the cutting operations are determined to be ended.

Delay means resets the tool after the termination of a constant delay time after the change of the contents of the counter means to zero.

Allowable magnitude means determines the allowable magnitude of torque load of the tool in accordance with the speed of rotation of the spindle, the distance between the tool and the axis of the spindle and the type of tool.

At least part of the record medium is rewound in a manner whereby the same command is repeatedly provided by the program means and compensating pulses are added to the command pulses by the compensating means so that the state of load of the machine is prevented from exceeding the allowable magnitude and the tool moves along a path different from that commanded by the program means, and during the repetition of the cutting operation the commands recorded on at least part of the record medium are executed while preventing the state of load of the machine from exceeding the allowable magnitude.

Temporary interrupting means temporarily interrupts command pulses on the record medium when the state of load of the machine becomes excessively large.

In order that the invention may be readily carried into effect it will now be described with reference to the accompanying drawings, wherein.

In the FIGS., the same components are identified by the same reference numerals.

Figure 1:
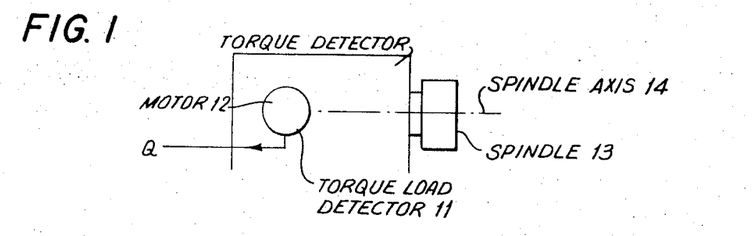
FIG. 1 is a schematic diagram of the spindle torque load detector of the control system of the first embodiment of the invention.

FIG. 1 shows a torque detector for detecting the torque load Q of the spindle of the machine tool. The torque detector 11 of FIG. 1 may comprise a detector which continuously detects the current flowing through a motor 12 which drives the spindle 13. Any other suitable type of detector which continuously detects the torque load Q of the spindle 13 may be utilized as the torque detector 11. The torsion of the spindle 13 may be detected by a strain gage. The spindle 13 has an axis 14.

Figure 2:
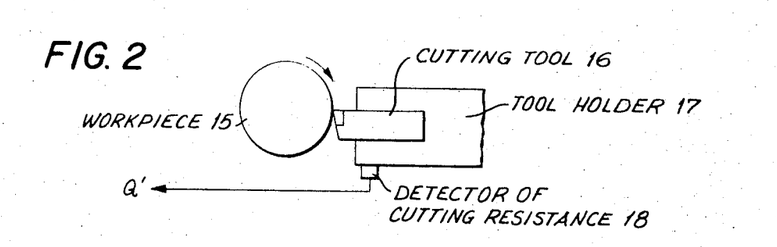
FIG. 2 is a schematic diagram of the cutting resistance detector of the second embodiment of the invention.
Figure 3:
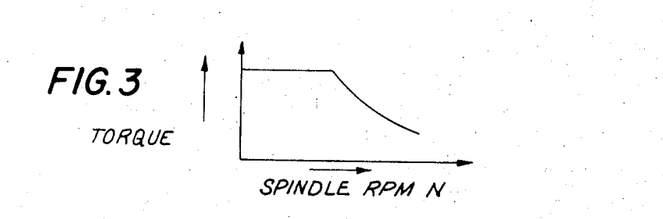
FIG. 3 is a graphical presentation of the torque load of the spindle relative to its speed of rotation.
Figure 4:
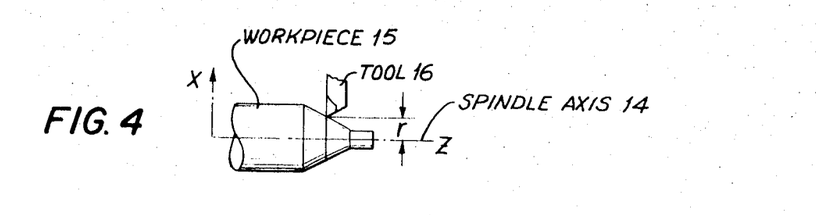
FIG. 4 is a schematic diagram of the tool and the workpiece in operative contact as in the control system of the invention.

The spindle 13 is allowed or permitted to have a torque load $q$ during the cutting operation on a workpiece 15, as shown in FIG. 2. The allowable torque load $q$ is determined by the following three considerations. The first consideration is the torque load which the motor 12 driving the spindle 13 may produce. This torque is a function of the rotary speed N, in RPM, of the spindle 13. The torque versus the rotary speed of the spindle is shown in FIG. 3. The second consideration is the type of tool Ti. The third consideration is the distance $r$ from the tip of the tool to the axis 14 of the spindle, as shown in FIG. 4.

The allowable torque $q$ of the spindle may thus be expressed as $$q = f(N, Ti, r)$$

The distance r may be determined or detected by a potentiometer which is mechanically coupled to a movable machine part moving together with the machine in the X-axis direction. The distance $r$ may also be detected or determined by a counter which counts the pulses supplied to the motor which moves the tool in directions along the X-axis.

In FIG. 2, a cutting tool 16 is supported by a tool holder 17. The tool 16 works or operates on a workpiece 15. A detector 18 detects the cutting resistance Q' of the tool 16, as hereinafter described.

In FIG. 4, the tool 16 is shown in operative proximity with the workpiece 15, relative to the X and Z-axes. The cutting edge or tip of the tool 16 is spaced the distance $r$ from the Z axis which is coincident with the axis 14 of the spindle 13 (FIG. 1).

Figure 5:
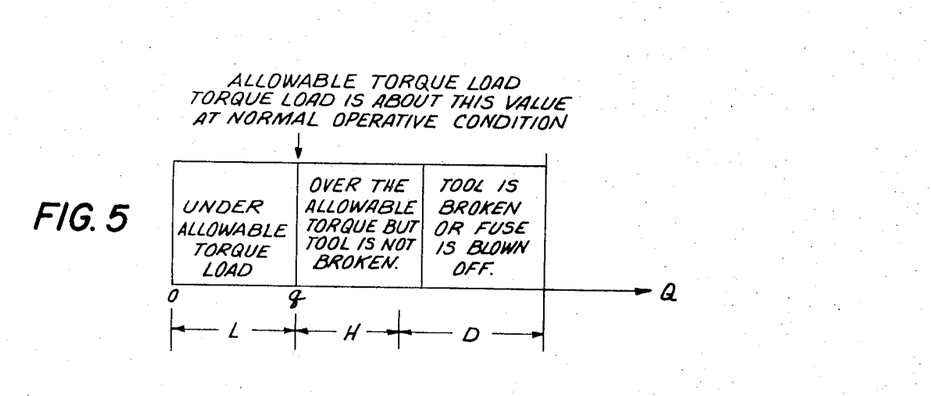
FIG. 5 illustrates the three ranges of the torque load and the spindle of the control system of the invention.

In a preferred embodiment of the invention, as shown in FIG. 5, the range of the torque load of the spindle 13 (FIG. 1) is divided into three ranges, L, H and D. The range L is that in which the torque load Q of the spindle is less than the allowable torque load $q$. The range H is that in which the torque load Q of the spindle is greater than the allowable torque load $q$, but the tool is not broken. In the range H, however, the tool is very close to being broken and the fuse of the control system is very close to being blown. The range D of FIG. 5 is one in which the torque load Q of the spindle is greater than the torque load Q in the range H and the tool is broken and/or the fuse of the control system is blown.

In a preferred embodiment of the invention, the rotary speed of the spindle 13 is kept constant by commands recorded on tape, and the magnitude of the cutting is automatically adjusted so that the torque load Q may become substantially equal to the allowable torque load $q$ of the spindle. The feed rate f may be controlled by commands recorded on the tape and the torque load may be automatically decreased before it exceeds the allowable torque load and the torque load may be automatically increased as it decreases.

Figure 6:
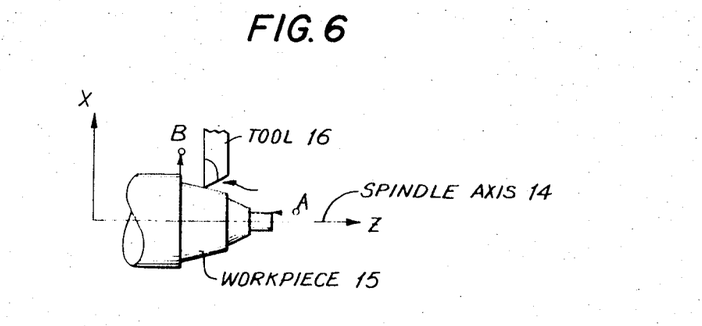
FIG. 6 is a schematic diagram of the tool and the workpiece in operative proximity relative to the axes of the coordinates X and Z of the control system of the invention.

FIG. 6 shows the profile of the completed workpiece 15. As shown in FIG. 6, as the tool 16 is moved in the −Z direction, which is to the left along the axis 14 of the spindle, the workpiece 15 may be moved in the +X direction which is the upward direction perpendicular to said axis of the spindle, but cannot be moved in the −X direction.

Figure 7:
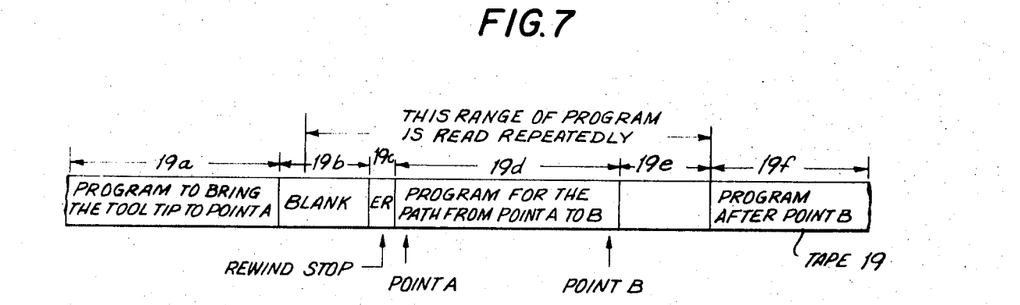
FIG. 7 illustrates the recorded program of the control system of the invention.

As shown in FIG. 7, a command tape 19 is divided into plurality of areas 19a, 19b, 19c, 19d, 19e and 19f. The program for bringing the tip or edge of the tool 16 to a point A, as shown in FIG. 6, is recorded in the area 19a of the tape 19. The area 19b of the tape 19 is blank and extends for approximately 50 mm. A code ER for stopping the rewinding of the tape 19 is recorded in the area 19c of said tape. A program for controlling the path of the tool 16 from the point A to a point B, as shown in FIG. 6, is recorded in the area 19d of the tape 19.

A command M20 which indicates the adaptive control mode and a code CR which indicates the end of the block, are recorded in the area 19e of the tape 19. The program after the point B is recorded in the area 19f of the tape 19. As shown in FIG. 7, a tape reader or readout starts the rewinding of the tape 19, but the rewind start signal and the rewinding of said tape is stopped by the reading or readout of the rewind stop code ER.

Figure 8:
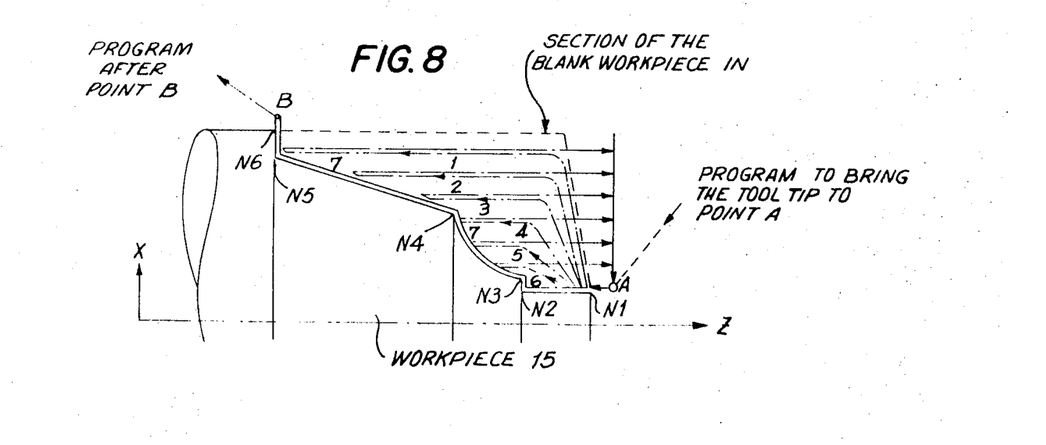
FIG. 8 is a schematic diagram of the paths along which the tool of the control system of the invention moves during operation on the workpiece.

FIG. 8 shows the actual movement of the tip of the tool 16 corresponding to a plurality of commands AN1, N1N2, N2N3, N3N4, which is an arc, N4N5 and N5N6 in the adaptive control system of the invention. The seven operating steps are repeated. The initial profile IN of the workpiece is shown in FIG. 8.

In the control system of the invention, the tool 16 is moved in the following manner. The tool starts at the point A (FIG. 8) and is moved in accordance with the program recorded on the tape. After the workpiece 15 has been cut, if the torque load Q of the spindle 13 exceeds the allowable torque load q of said spindle the movement of the tool in the +X direction is overlapped with the movement in the −Z direction. If the range D is entered the movement of the tool in the −Z direction is stopped. When the range H is reentered, the movement in the −Z direction is restarted.

When the torque load of the spindle becomes less than the allowable torque load, the command recorded in the tape 19 is executed. However, while the tool 16 is away from the path commanded by the tape 19, the recorded command to move the tool in the +X direction is neglected. The profile of the completed workpiece 15 extends from the point A to the point B. The tool 16 is therefore moved only in the −Z direction.

When the path commanded by the instructions of the program recorded on the tape 19 is followed by the tool 16, said tool is moved in accordance with the program command for a specific constant period of time and is then returned, at a high speed, in the +Z direction. When a position equivalent to that of the point A on the Z axis is reached by the tool 16, the movement of said tool in the +Z direction is stopped and said tool is moved at high speed in the −X direction until it arrives at the point A.

Simultaneously with the return of the tool 16 to the point A, the tape 19 is rewound until the area 19c thereof, in which the ER code is recorded, is reached.

At such time, the tool is reset, so that suitable means must be provided to prevent the auxiliary function of the machine from being reset by the resetting of the tool.

The tool 16 is then started again from point A and is moved in accordance with the program recorded on the tape 19 and cuts the workpiece 15 in a repetition of the aforedescribed cutting operation.

After the workpiece 15 has been cut by the tool 16, said tool is moved along the programmed path as long as the torque load of the spindle does not exceed the allowable torque load. Finally, the tool reaches the point B.

If the torque load of the spindle does not exceed the allowable torque load, that is, if the tool 16 is not moved away from the programmed path recorded in the tape 19 between the points A and B, and the command M20 recorded in the area 19e of said tape is provided, it is determined that the programmed profile has been attained. The adaptive mode is then finished and the tape 19 continuously provides the next-succeeding command without being rewound.

Figure 9:
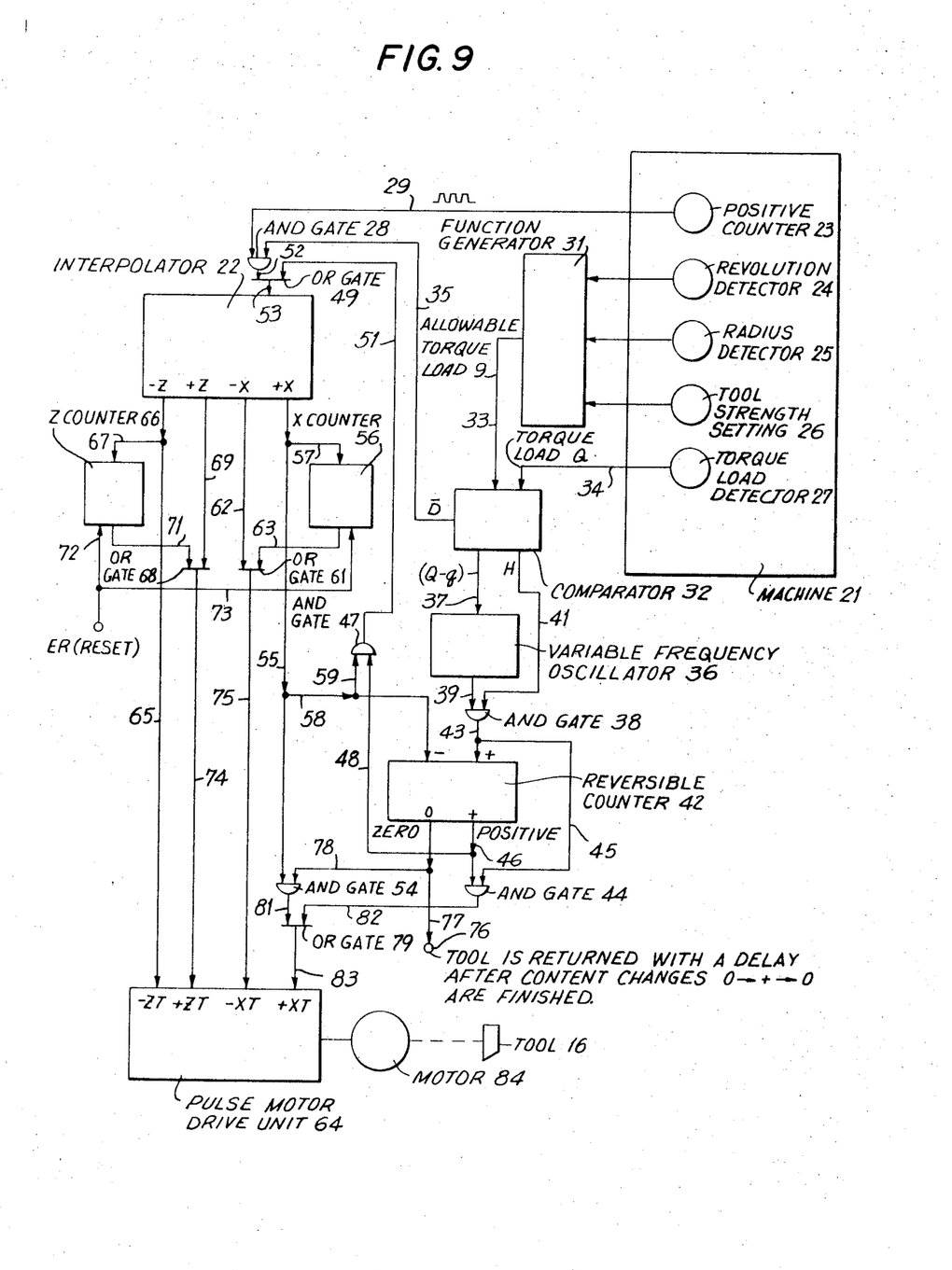
FIG. 9 is a block diagram of the control system of the invention.

FIG. 9 shows an embodiment of the control system of the invention. In FIG. 9, a well known machine 21 is coupled to a well known interpolator 22. The machine 21 includes a position coder 23 which indicates the position of the tool 16 (FIG. 6), a revolution detector 24 which indicates the speed of rotation of the spindle 13 (FIG. 1) and a radius detector 25 which indicates the distance r of the edge of the tool 16 from the spindle axis 14 (FIG. 4), a tool strength setting 26 which indicates the type of tool Ti and a torque load detector 27, of the type of FIG. 1, which indicates the torque Q of the spindle.

The output of the position coder 23 of the machine 21 is connected to a first input of an AND gate 28 via a lead 29. The output of each of the revolution detector 24, the radius detector 25 and the tool strength setting 26 is connected to a corresponding input of a function generator 31. The output of the function generator 31 is connected to a first input of a comparator 32. The function generator 31 supplies the allowable torque load magnitude $q$ to the comparator 32 via its output lead 33. The output of the torque load detector 27 is the torque load Q and is supplied to a second input of the comparator 32 via a lead 34. A first output of the comparator 32 is connected to the second input of the AND gate 28 via a lead 35. A second output of the comparator 32 is connected to the input of a variable frequency oscillator 36 via a lead 37. The output signal in the lead 37 is the difference between the torque load Q and the allowable torque magnitude $q$. The output of the variable frequency oscillator 36 is connected to the first input of an AND gate 38 via a lead 39. The third output of the comparator 32 is connected to the second input of the AND gate 38 via a lead 41.

The output of the AND gate 38 is connected to the forward input of a reversible counter 42 via a lead 43 and to a first input of an AND gate 44 via a lead 45. The positive output of the reversible counter 42 is connected to the second input of the AND gate 44 via a lead 46 and to a first input of an AND gate 47 via a lead 48. The output of the AND gate 47 is connected to a first input of an OR gate 49 via a lead 51. The output of the AND gate 28 is connected to the second input of the OR gate 49 via a lead 52. The output of the OR gate 49 is connected to the input of the interpolator 22 via a lead 53.

The +X output of the interpolator 22 is connected to a first input of an AND gate 54 via a lead 55, to the input of an X-counter 56 via the leads 55 and 57, and to the second input of the AND gate 47 via the lead 55 and leads 58 and 59. The −X output of the interpolator 22 is connected to a first input of an OR gate 61 via a lead 62. The output of the X-counter 56 is connected to the second input of the OR gate 61 via a lead 63.

The −Z output of the interpolator 22 is connected to the −ZT input of a pulse motor drive unit 64 via a lead 65 and to the input of a Z-counter 66 via the lead 65 and a lead 67. The +Z output of the interpolator 22 is connected to a first input of an OR gate 68 via a lead 69. The output of the Z counter 66 is connected to the other input of the OR gate 68 via a lead 71. The reset signal ER from the tape 19 (FIG. 7) is supplied to a second input of the Z-counter 66 via a lead 72 and to a second input of the X-counter 56 via the lead 72 and a lead 73.

The output of the OR gate 68 is connected to the +ZT input of the pulse motor drive unit 64 via a lead 74. The output of the OR gate 61 is connected to the −XT input of the pulse motor drive unit 64 via a lead 75. The second output of the reversible counter 42 is connected to an output terminal 76 via a lead 77 and to the second input of the AND gate 54 via the lead 77 and a lead 78. The output of the AND gate 54 is connected to a first input of an OR gate 79 via a lead 81. The output of the AND gate 44 is connected to the second input of the OR gate 79 via a lead 82. The output of the OR gate 79 is connected to the +XT input of the pulse motor drive unit 64 via a lead 83. The pulse motor drive unit 64 drives the tool 16 via a motor 84.

Each time a pulse is supplied to the input of the interpolator 22 via the lead 53, said interpolator provides the programmed pulse distributing arithmatic operation and provides a command pulse at one of its output terminals −Z or +Z, or −X or +X. Each of the command pulses is supplied to the corresponding input terminal −Z, +Z, −X or +X of the pulse motor drive unit 64. Thus, each time a command pulse is provided, the pulse motor of the corresponding Z or X-axis is rotated by one step in the positive or negative direction.

In the embodiment of FIG. 9, the pulses produced by the position coder 23 of the machine 21 are transmitted through the AND gate 28 and the OR gate 49 and are supplied to the input of the interpolator 22 via the lead 53. The tool 16 therefore moves from the point A in FIG. 8 in accordance with the programmed commands recorded in the tape 19 (FIG. 7) and starts to cut workpiece 15 at the point N1. After the workpiece 15 is cut by the tool 16, however, if the torque load Q of the spindle 13 (FIG. 1) exceeds the allowable torque load $q$ of said spindle a compensating pulse is supplied to the +XT input of the pulse motor drive unit 64 and causes the tool to be moved away from the workpiece in the +X direction.

The allowable torque load $q$ is calculated by the function generator 31 from the number of revolutions or rotary speed of the spindle, provided by the revolution detector 24, the radius or distance $r$, provided by the radius detector 25, and the type of tool Ti, provided by the tool strength setting 26. The comparator 32 compares the torque load Q of the spindle with the allowable torque load $q$ of said spindle. If the torque load Q exceeds the allowable torque load q the comparator 32 controls the variable frequency oscillator 36 in accordance with the difference Q −q. Since the torque load Q is in the range H (FIG. 5), the compensating pulse from the variable frequency oscillator 36 is supplied to the forward input of the reversible counter 42 via the AND gate 38 and provides a positive content of said counter, so that the AND gate 44 is switched to its conductive condition and the compensating pulse is supplied to the input +XT of the pulse motor drive unit 64 via the OR gate 79.

The pulse distribution is continued in accordance with the commands of the program recorded in the tape 19 (FIG. 7) and the command pulses provided at the output −Z of the interpolator 22 are utilized without modification to move the tool in the −Z direction. On the other hand, since the contents of the reversible counter 42 are positive, the command pulse provided at the output +X of the interpolator 22 is blocked by the AND gate 54 and is not utilized to drive the motor 84, and is supplied to the reverse or negative input of the reversible counter 42. At such time, each time a pulse is distributed at the output +X of the interpolator 22, a pulse is supplied to said interpolator via the AND gate 47 and the OR gate 49, and an additional pulse distributing arithmetic operation is performed in order to accelerate the distribution.

When the torque load Q enters the range D (FIG. 5), a signal $\overline{D}$ is provided by the comparator 32 and switches the AND gate 28 to its non-conductive condition, since the signal $\overline{D}$ is logical "0" if the torque load Q is in the range D and is logical "1" if said torque load is not in the range D. When the AND gate 28 is non-conductive, the pulse distribution by the interpolator 28 is stopped and the movement of the tool 16 in the −Z direction is stopped. When the torque load Q returns to the range H, the same movement is resumed.

Command pulses provided at the −Z and +X outputs of the interpolator 22 are stored in the Z-counter 66 and the X counter 56, respectively. Thus, the Z-counter 66 represents the Z axis component and the X-counter 56 represents the X-axis component of the distance from the point A (FIG. 8) to the tool 16 at the instant that the contents of the reversible counter 42 becomes zero. The tool 16 is moved in the −X direction in accordance with the programmed command, so that the change of the contents of the reversible counter 42 from positive to zero indicates the arrival of said tool at a point on the path commanded by the program. The tool 16 is then reset to the point A.

The tool reset may be commenced after a constant delay time has elapsed after the change of the contents of the reversible counter 42 to zero. This enables the tool 16 to be reset along a reset path which is somewhat outside the first path 1 of said tool (FIG. 8) and thus permits the prevention of the cutting of the workpiece 15 by the edge of said tool during the resetting of said tool. The tool 16 is first reset in the +Z direction and then in the −X direction. The tool may be reset by utilizing the contents of the Z counter 66 and the X counter 56, as hereinafter described.

Figure 10:
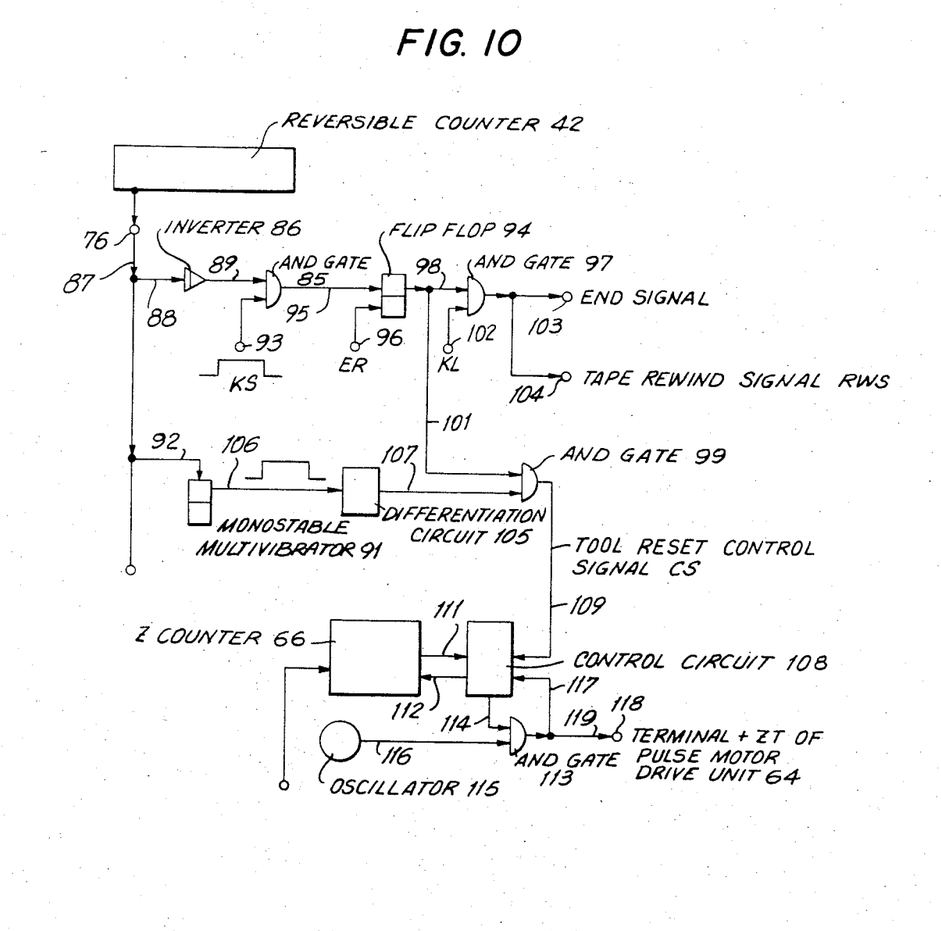
FIG. 10 is a block diagram of the control circuit for controlling the rewinding of the program tape and the resetting of the tool of the control system of the invention.

FIG. 10 shows a control circuit for controlling the rewinding of the tape 19 (FIG. 7) and the resetting of the tool 16 (FIG. 6). The reversible counter 42 of FIG. 10 is that of FIG. 9. The output terminal 76 of the zero output of the reversible counter 42 is connected to a first input of an AND gate 85 via an inverter 86 and leads 87, 88 and 89, and is connected to the input of a monostable multivibrator 91 via the lead 87 and a lead 92. An input signal KS is supplied to the second input of the AND gate 85 via an input terminal 93. The output of the AND gate 85 is connected to the set input of a flip flop 94 via a lead 95. The signal ER is supplied to the reset input of the flip flop 94 via an input terminal 96.

The set output of the flip flop 94 is connected to a first input of an AND gate 97 via a lead 98 and to a first input of an AND gate 99 via a lead 101. A signal KL is supplied to the second input of the AND gate 97 via an input terminal 102. The output of the AND gate 97 is connected to an output terminal 103 which provides the end signal and to an output terminal 104 which provides the tape rewind signal. The output of the monostable multivibrator 91 is connected to the input of a differentiation circuit 105 via a lead 106. The output of the differentiation circuit 105 is connected to the second input of the AND gate 99 via a lead 107. The output of the AND gate 99 is connected to a first input of a control circuit 108 via a lead 109. The output signal from the AND gate 99 is the tool reset control signal.

The output of the Z counter 66 of FIG. 9 is connected to a second input of the control circuit 108 via a lead 111. A first output of the control circuit 108 is connected to an input of the Z counter 66 via a lead 112. A second output of the control circuit 108 is connected to a first input of an AND gate 113 via a lead 114. An oscillator 115 produces an output which is connected directly to the second input of the AND gate 113 via a lead 116. The output of the AND gate 113 is connected to a third input of the control circuit 108 via a lead 117 and to an output terminal 118 via a lead 119. The output terminal 118 is the input +ZT of the pulse motor drive unit 64 of FIG. 9.

The zero output of the reversible counter 42 is a signal which is logical "1" when the contents of said counter are zero and which is logical "0" when said contents are not zero. Therefore, when a compensating pulse is transferred and the contents of the reversible counter 42 become positive, even once in an operation, the flip flop 94 is set via the inverter 86 and the AND gate 85. The signal KS which is supplied to the AND gate 85 becomes logical "1" in such operation. The signal KL which is supplied to the AND gate 97 is produced at the end of the operation.

If the signal transferred by the AND gate 97 is logical "1," a tape rewind signal RWS is produced at the output terminal 104. If the signal transferred by the AND gate 97 is logical "0," a signal END is produced at the output terminal 103, indicating the end of the entire adaptive control operation. When the contents of the reversible counter 42 return from positive to zero, that is, when the tool 16 (FIG. 6) reaches the path commanded by the program recorded on the tape 19 (FIG. 7), the monostable multivibrator 91 is triggered and produces a pulse of constant duration. The pulse produced by the monostable multivibrator 91 is shaped by the differentiation circuit 105 and is supplied to the AND gate 99.

Since the set output of the flip flop 94 is connected to the AND gate 97, a tool reset control signal CS is provided at the output of the AND gate 99 after the expiration of a constant delay time after the contents of the reversible counter 42 change from positive to zero. The tool reset control signal CS is supplied to the control circuit 108 to switch the AND gate 113 to its conductive condition when the contents of the Z counter 66 are not zero to provide a rapid return pulse from the oscillator 115 to the +ZT input of the pulse motor drive unit 64 (FIG. 9) via the output terminal 118. Each time a pulse is transferred through the AND gate 113, 1 is subtracted from the contents of the Z-counter 66 by the control circuit 108. When the contents of the Z-counter 66 become zero, the AND gate 113 is switched to its non-conductive condition and the resetting of The tool 16 in the +Z direction ends.

The same control as hereinbefore described is performed with regard to the X-counter 56 of FIG. 9, so that the tool 16 is returned to the point A of FIG. 8. On the other hand, the readout or reading of the rewind stop code ER recorded in the area 19c of the tape 19 of FIG. 7 causes said tape, which has been rewound, to stop, and also causes the X-counter 56 and the Z counter 66 of FIG. 9 and the flip flop 94 of FIG. 10 to be reset. If the reversible counter 42 is never changed to positive in an operation, this indicates that the tip of the tool 16 is moved along the path commanded by the program recorded on the tape 19. In this case, the signal END is provided at the output terminal 103 of FIG. 10, and the tape 19 (FIG. 7) is not rewound, and the next command recorded on said tape is provided.

Hereinbefore, the disclosed adaptive control system of the invention detects the torque load of the spindle 13 (FIG. 1) and the amount of cutting by the tool 16 (FIG. 2) is reduced in order to maintain the detected torque load at a magnitude which is less than an allowable torque magnitude. The cutting resistance of the tool 16 may be detected without detecting the torque load Q of the spindle 13. FIG. 2 discloses an arrangement for detecting the cutting resistance of the cutting tool 16. In FIG. 2, the detector 18 of the cutting resistance of the cutting tool 16 is affixed to the tool holder 17 and is supported thereby. The detector 18 detects the cutting resistance $Q'$ of the tool 16 in the form of the deflection of the tool holder 17.

Figure 11:
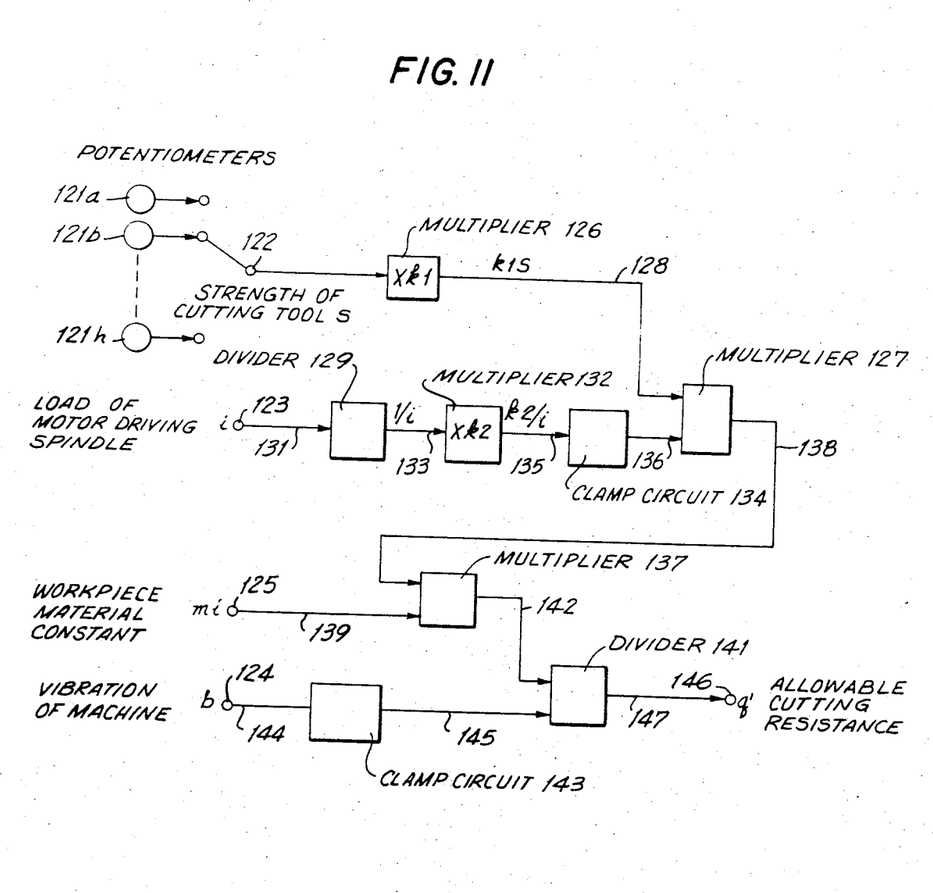
FIG. 11 is a block diagram of a circuit for calculating the allowable cutting resistance of the tool in the control system of the invention.

FIG. 11 illustrates a circuit arrangement for calculating the allowable magnitude $q'$ of the cutting resistance of the cutting tool 16 (FIG. 6) from different data. The data utilized to determine the allowable magnitude $q'$ of the cutting resistance of the tool 16 (FIG. 6) are the strength s of the cutting tool 16, the load $i$ of the motor which drives the spindle 13 (FIG. 1), the material constant $mi$ of the workpiece 15 (FIG. 6) and the vibration b of the machine. The strength s of the cutting tool 16 is determined by the form and material thereof and is determined by a plurality of potentiometers 121a, 121b, ... 121h, as shown in FIG. 11.

The load $i$ of the motor which drives the spindle 13 (FIG. 1) is readily determined in accordance with the current flow in said motor. When the current exceeds a predetermined level, the detected load value of the motor functions to reduce the allowable cutting resistance of the tool 16 (FIG. 6). A signal corresponding to the strength s of the cutting tool is provided at an input terminal 122 of the circuit of FIG. 11 and a signal corresponding to the load $i$ of the motor which drives the spindle 13 (FIG. 1) is supplied to an input terminal 123 of said circuit.

The vibration b of the machine is determined as a DC voltage which is applied to an input terminal 124 of the circuit of FIG. 11. When the voltage applied to the input terminal 124 exceeds a predetermined level, the allowable cutting resistance $q'$ of the tool 16 (FIG. 6) is reduced.

The material constant $mi$ of the workpiece 15 (FIG. 6) is determined by the material of the workpiece and may be stored, for example, on the tape 19 of FIG. 7 as an auxiliary command. A signal corresponding to the material constant $mi$ of the workpiece 15 is supplied to an input terminal 125 of the circuit of FIG. 11. The material constant command overrides the calculated allowable magnitude $q'$ of the cutting resistance of the tool 16. As a result of the override, the allowable magnitude of the cutting resistance of the tool 16 may be reduced from zero to 100 percent, depending upon the material constant $mi$ of the workpiece 15.

In FIG. 11, the input terminal 122 is connected to the input of a multiplier 126 which multiplies the signal s supplied to said input terminal by a constant k1. The output of the multiplier 126 is connected to a first input of a multiplier 127 via a lead 128. The input terminal 123 is connected to the input of a divider 129 via a lead 131. The divider 129 functions to produce an output signal $1/i$. The output of the divider 129 is connected to the input of a multiplier 132 via a lead 133. The multiplier 132 multiplies the signal $1/i$ by a constant k2, so that the output of said multiplier is $k2/i$.

The output of the multiplier 132 is connected to the input of a clamp circuit 134 via a lead 135. The output of the clamp circuit 134 is connected to the second input of the multiplier 127 via a lead 136. The output of the multiplier 127 is connected to a first input of a multiplier 137 via a lead 138. The input terminal 125 is connected to the second input of the multiplier 137 via a lead 139. The output of the multiplier 137 is connected to a first input of a divider 141 via a lead 142. The input terminal 124 is connected to the second input of the divider 141 via a clamp circuit 143 and leads 144 and 145. The output of the divider 141 is connected to an output terminal 146 via a lead 147. The allowable cutting resistance $q'$ is provided at the output terminal 146. Each clamp circuit 134 and 143 clamps its output until the input thereto reaches a predetermined level.

As hereinbefore described, in accordance with the invention, the operation of the tool 16 (FIG. 6) is controlled so that the torque load Q of the spindle 13 (FIG. 1) may not exceed a constant limit. This prevents the breaking of the cutting tool 16 and/or the blowing of a fuse in the circuit. The arrangement for accomplishing this is of simple structure, as is the program for controlling the operation.

While the invention has been described by means of specific examples and in a specific embodiment, I do not wish to be limited thereto, for obvious modifications will occur to those skilled in the art without departing from the spirit and scope of the invention.

The interpolator 22 of FIG. 9 is disclosed in U. S. Pat. No. 3,416,056.

I claim:

1. An adaptive control system for numerical control of a cutting tool cutting a workpiece mounted on a machine spindle rotated about its axis, said control system comprising program means for controlling the movement of the tool in accordance with commands recorded on tape; a detector for detecting the load condition Q of the machine; a function generator for generating an allowable load condition $q$; a comparator connected to the detector and the function generator for comparing the magnitudes of the load condition Q and the allowable load condition $q$; a variable frequency oscillator connected to the comparator for generating compensation pulses having a frequency proportional to the difference between the load condition Q and the allowable load condition $q$ only when the load condition Q is larger than the allowable load condition $q$; a pulse distributor; a reversible counter connected to the pulse distributor and to the oscillator for providing an addition of one to its contents every time the variable frequency oscillator generates the compensation pulses and providing a subtraction of one from the contents thereof every time the pulse distributor generates a distribution pulse in a +X longitudinal axis direction; drive motors; a drive circuit connected to the pulse distributor for receiving distribution pulses in +X, −X, +Z and −Z cross axis directions from the pulse distributor and controlling the drive motors in each axis; a gate connected between the pulse distributor and reversible counter and the drive circuit for blocking the distribution pulse in the +X axis to be supplied to the drive circuit until the contents of reversible counter becomes zero, the compensation pulses being supplied to the drive circuit when the load condition Q in a machining process controlled by a tape command implying an adaptive mode is larger than the allowable load condition $q$, so that the cutting tool is moved in the +X direction and the load condition Q is reduced, the machining process ends and the cutting tool is returned to the start point of the machining process in the adaptive mode when the contents of the reversible counter reach zero, the command tape, the program means including rewinding means for rewinding at the same time, to the top of the machining process commands to repeat the same processes as those of the first machining process, the end of all the processes in the adaptive mode contained in the command tape being indicated when the compensation pulses are not generated within a machining cycle or when the reversible counter has contents of all zeros within a machining cycle.

2. An adaptive control system for numerical control, as claimed in claim 1, further comprising a Z-counter connected between the pulse distributor and the drive circuit for providing an addition of one to the contents thereof whenever the pulse distributor generates a distribution pulse in the −Z direction, an X-counter for providing an addition of one to the contents thereof whenever the pulse distributor generates a distribution pulse in the +X direction and an oscillator at the cutting tool for providing restoration motion wherein pulses generated by the oscillator are supplied to the drive circuit so that the cutting tool is moved in the +Z direction, and at the same time, one is subtracted from the contents of the Z-counter everytime the pulse is generated, the end of the cutting tool restoration in the Z-axis direction is indicated when the contents of the Z-counter reach zero, the pulses generated after the completion of the cutting tool restoration in the Z-axis direction are supplied to the drive circuit to move the cutting tool in the −X direction, one is subtracted from the contents of the X-counter every time the pulse is generated, and the completion of the tool restoration is indicated when the contents of the X-counter reach zero.

3. An adaptive control system for numerical control as claimed in claim 1, further comprising means for adjusting the parameters of the speed of revoltuion of the main shaft, the distance between the tool and the center of the main shaft and the type of cutting tool thereby permitting variation of the allowable load condition $q$.

4. An adaptive control system for numerical control as claimed in claim 1, wherein the load condition Q is divided into three regions in accordance with magnitude of the load condition Q, the three regions comprising a region L wherein the load condition Q is smaller than the allowable load condition $q$, a region H wherein the load condition Q is larger than the allowable load condition $q$ but smaller than a level which may cause the cutting tool to be broken, and a region D wherein the load condition exceeds the limit to prevent breaking of the cutting tool or the limit at which a protection fuse may blow, the distribution operation of the pulse distributor being temporarily stopped while the load condition Q is in the D region.

5. An adaptive control system for numerical control as claimed in claim 2, further comprising means for command-controlled movement of the cutting tool for a specified period immediately after the reversible counter reaches zero and followed by restoration motion of the cutting tool thereby preventing damage of the cutting tool due to contact with the workpiece in restoration motion.

* * * * *